(12) United States Patent
Shi et al.

(10) Patent No.: US 8,483,759 B2
(45) Date of Patent: Jul. 9, 2013

(54) APPLICATION PROCESSOR, MODEM AND METHOD FOR COMMUNICATING THEREBETWEEN

(75) Inventors: Feng Shi, Shanghai (CN); Haifeng Wu, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 219 days.

(21) Appl. No.: 13/086,299

(22) Filed: Apr. 13, 2011

(65) Prior Publication Data

US 2012/0020394 A1    Jan. 26, 2012

(30) Foreign Application Priority Data

Jul. 23, 2010   (CN) .......................... 2010 1 0240590

(51) Int. Cl.
*H04B 1/38* (2006.01)
(52) U.S. Cl.
USPC ............................. 455/558; 455/557; 375/222
(58) Field of Classification Search
USPC ..................... 455/558, 557; 375/222
See application file for complete search history.

(56) References Cited

U.S. PATENT DOCUMENTS

| 6,584,326 | B1 * | 6/2003 | Boydston et al. ............. 455/558 |
| 2003/0112805 | A1 | 6/2003 | Stanton | |
| 2005/0153741 | A1 * | 7/2005 | Chen et al. ..................... 455/558 |
| 2008/0167074 | A1 | 7/2008 | Van Steenbergen | |
| 2009/0163244 | A1 * | 6/2009 | Parkkinen et al. ............ 455/558 |
| 2010/0136982 | A1 * | 6/2010 | Zabawskyj et al. ........... 455/445 |
| 2011/0117944 | A1 * | 5/2011 | Cao et al. ....................... 455/509 |
| 2011/0117962 | A1 * | 5/2011 | Qiu et al. ....................... 455/558 |
| 2011/0117965 | A1 * | 5/2011 | Gong et al. .................... 455/558 |
| 2011/0195749 | A1 * | 8/2011 | Lan ................................. 455/558 |
| 2011/0223971 | A1 * | 9/2011 | Dewey et al. ................. 455/558 |

FOREIGN PATENT DOCUMENTS

CN    101111022 A    1/2008

* cited by examiner

*Primary Examiner* — Christopher M Brandt
(74) *Attorney, Agent, or Firm* — Kilpatrick Townsend Stockton LLP

(57) ABSTRACT

The invention discloses a method for communicating an application processor and a modem. A physical link is provided between the application processor and the modem and corresponds to multiple virtual channels. The modem is embedded in a user equipment, and the user equipment is adapted for multiple user identification module cards. The method comprises: establishing, by the application processor, a relation of combining virtual channels to the user identification module card for receiving the service requests when service requests are sent to at least a user identification module card of the user equipment; and transferring the service requests to the user identification module card through the virtual channels which have the relation of combining to the user identification module card. The virtual channels which have the relation of combining to the user identification module card transfer the service requests so as to combine each user identification module card in a multi-card multi-standby mobile phone to a corresponding channel, avoiding the situation that when the intelligent phone transfers the service request, it is uncertain which channel is identified to transfer the service request and which user identification module card receives the transferred service request.

21 Claims, 2 Drawing Sheets

APPLICATION PROCESSOR, MODEM AND METHOD FOR COMMUNICATING THEREBETWEEN

CROSS REFERENCE TO RELATED APPLICATIONS

The present application claims the priority of Chinese Patent Application No. 201010240590.7, entitled "Application Processor, Modem and Method for Communicating Therebetween", and filed on Jul. 23, 2010, the entire disclosure of which is incorporated herein by reference.

FIELD OF THE INVENTION

The present invention relates to an application processor, user equipments, and a method for communicating the application processor and a modem.

BACKGROUND OF THE INVENTION

Intelligent phones are popularly employed nowadays, in which personal users may stall, configure and run application program randomly. Further, terminal equipments, like personal computer, may operate intelligent phones. In prior art, GSM protocol 3GPP27.010 defines a multiplex (MUX) protocol for interaction between terminal equipments and user equipments. The MUX protocol provides a virtual connection including multiple channels for communicating terminal devices and user equipments, and each channel may function as an actual channel for one service. An intelligent phone comprises an application processor (AP) and a modem, between which a physical link is provided and corresponds to multiple virtual channels according to GSM protocol 3GPP27.010.

In a prior art intelligent phone, an application processor normally controls a modem simply in the case of single-card single-standby application. Taking an intelligent phone with an application processor and a modem as an example, FIG. 1 schematically illustrates a MUX operation of the application processor and the modem in prior art. Referring to FIG. 1, a physical link is established between the terminal equipment (TE) and the user equipment (UE) through serial interface. Hereinafter, the terminal equipment has an extendable definition referring to, for instance, an application processor embedded into the intelligent phone, and/or application processor embedded into a personal computer. Similarly, the user equipment has an extendable definition referring to, for instance, the modem in the intelligent phone. As for a single-card single-standby intelligent phone, when an intelligent phone is dialing for calling, one channel is specified as a link between the AP and the modem for point-to-point protocol (PPP) data dialing, and another channel is specified for AT command. As for the modem of the single-card single-standby intelligent phone, any MUX channel, upon receiving a prompt of calling (e.g. a prompt "RING" of standard AT command), can exclusively identify a corresponding User Identification Module card (e.g. SIM card), i.e. the only SIM card in the modem card slot. In this case, this session could be processed in any channel supporting AT command by ways of connection or refusal etc. The dialing data of the intelligent phone are processed by the application processor, A/D converted by modem, and transferred to the only SIM card in the modem card slot.

The prior art multi-card multi-standby intelligent phones are increasingly popular, incurring more complicated situations upon receiving dialing service request or other service request, for example it could not be found to which SIM card the service request, e.g. dialing, should be sent, to which SIM card a calling prompt on a channel is directed, in which MUX channel the calling is processed, and the like. In general, a MUX channel is unable to be combined to a card when there are multiple cards, resulting in unpredictable mess in use with multiple cards.

Many existing patents, for example US patent publication Number US2008/0167074A1, are relevant to multi-card multi-standby phones, but do not propose a solution to overcome the drawback of prior art.

SUMMARY OF THE INVENTION

A technical problem solved by the invention is to obviate the situations in which it is uncertain to identify a channel for transferring service requests, resulting in inappropriate correspondence of user identification module cards to virtual channels for transferring service requests.

In order to solve the technical problem above, the invention provides a method for communicating an application processor and a modem. A physical link is provided between the application processor and the modem and corresponds to multiple virtual channels. The modem is embedded in a user equipment, and the user equipment is adapted for multiple user identification module cards. The method comprises:

establishing, by the application processor, a relation of combining virtual channels to the user identification module card for receiving the service requests when service requests are sent to at least a user identification module card of the user equipment; and transferring the service requests to the user identification module card through the virtual channels which have the relation of combining to the user identification module card.

Optionally, establishing a relation of combining virtual channels to the user identification module card comprises:

specifying the virtual channels as dedicated channels for transferring the service requests of the user identification module card which is combined with the virtual channels.

Optionally, specifying the virtual channels as dedicated channels for transferring the service requests of the user identification module card which is combined with the virtual channels, comprises:

transferring channel assignment instructions to the modem through the virtual channels, the channel assignment instructions including channel types and information related to the user identification module card which is combined with the virtual channels.

Optionally, specifying the virtual channels as dedicated channels for transferring the service requests of the user identification module card which is combined with the virtual channels, comprises:

adding, channel types and information related to the user identification module card which is combined with the virtual channels, to the service requests.

Optionally, the channel types comprise PPP channels and AT channels.

Optionally, the application processor is embedded in a terminal equipment or the user equipment.

The invention has the following advantages over the prior art:

when a service request is transferred to at least a user identification module card in a user equipment, the application processor establishes a relation of combining a virtual channel to the user identification module card for receiving the service request. The virtual channel which has the relation of combining to the user identification module card transfers the service request so as to combine each user identification module card in a multi-card multi-standby mobile phone to a corresponding channel, thereby avoiding the situation that when the intelligent phone transfers the service request, it is uncertain which channel is identified to transfer the service request and which user identification module card receives the transferred service request.

In order to solve the technical problem above, the invention provides an application processor adapted to send service requests to a modem. The modem is embedded in a user equipment. A physical link is provided between the application processor and the modem and corresponds to multiple virtual channels. The user equipment is adapted for multiple user identification module cards. The application processor comprises:

a combining unit for establishing a relation of combining virtual channels to a user identification module card for receiving the service requests when the application processor sends service requests to at least a user identification module card of the user equipment; and a transferring unit for transferring the service requests associated with the user identification module card through the virtual channels which have the relation of combining to the user identification module card.

Optionally, the combining unit specifies the virtual channels as dedicated channels for transferring the service requests of the user identification module card which is combined with the virtual channels, thereby establishing the relation of combining virtual channels to the user identification module card.

Optionally, the combining unit specifies, by channel assignment instructions, the virtual channels as dedicated channels for transferring the service requests of the user identification module card which is combined with the virtual channels, the channel assignment instructions including channel types and information related to the user identification module card which is combined with the virtual channels.

Optionally, the combining unit specifies the virtual channels as dedicated channels for transferring the service requests of the user identification module card which is combined with the virtual channels by adding channel types and information related to the user identification module card which is combined with the virtual channels, to the service requests.

Optionally, the channel types comprise PPP channels and AT channels.

The application processor has a combining unit for establishing the relation of combining the user identification module card and the virtual channels, obviating inappropriate correspondence of user identification module cards to virtual channels.

In order to solve the technical problem above, the invention provides a modem embedded in the user equipment for receiving service requests from an application processor. The modem comprises:

an acquiring unit for acquiring a relation of combining virtual channels to a user identification module card from the application processor;

a receiving unit for receiving the service requests from the application processor through the virtual channels; and an assignment unit for assigning the service requests from the receiving unit to the user identification module card which has the relation of combining with the virtual channels.

Optionally, the combining unit of the application processor establishes, by channel assignment instructions, a relation of combining the user identification module card with virtual channels, the channel assignment instructions including channel types and information related to the user identification module card which is combined with the virtual channels;

the transferring unit of the application processor transfers the channel assignment instructions to the modem through the virtual channels; and the acquiring unit of the modem acquiring the relation of combining the virtual channels with the user identification module card by receiving and parsing the channel assignment instructions.

Optionally, the channel types comprise PPP channels and AT channels.

Optionally, the user equipment is a triple-card triple-standby intelligent phone.

The modem has an acquiring unit for acquiring the relation of combining the user identification module card to the virtual channels from the application processor. The assignment unit assigns the service requests to corresponding user identification module card, avoiding the situation that it is uncertain to determine to which user identification module card service requests should be sent so as to incur inappropriate correspondence of user identification module card to the virtual channels.

DETAILED DESCRIPTION OF THE INVENTION

In a method for communicating an application processor and a modem according to an embodiment of the invention, when a service request is transferred to at least a user identification module card in a user equipment, the application processor establishes a relation of combining a virtual channel to the user identification module card for receiving the service request. The virtual channel which has the relation of combining to the user identification module card transfers the service request so as to combine each user identification module card in a multi-card multi-standby mobile phone to a corresponding channel, thereby avoiding the situation that when the intelligent phone transfers the service request, it is uncertain which channel is identified to transfer the service request and which user identification module card receives the transferred service request.

In order that the invention is better known to the skilled persons in the pertinent art and that the invention is described more clearly in detail, a method for communicating an application processor and a modem is interpreted below in combination with accompanied drawings.

Figure 1:
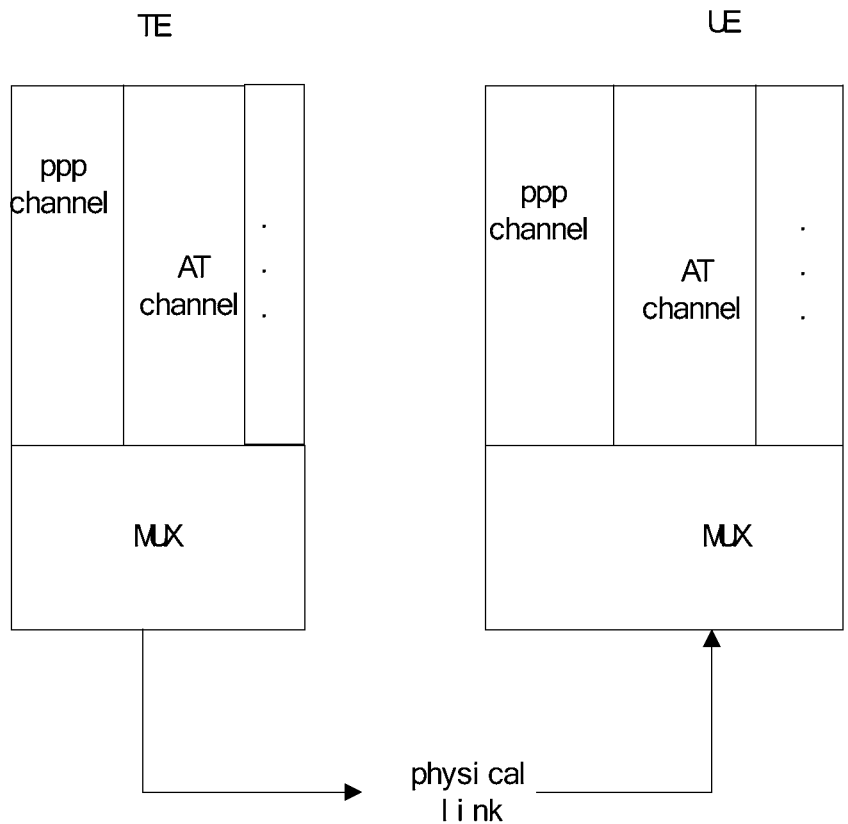
FIG. 1 schematically illustrates a MUX operation of a terminal equipment and a user equipment in prior art.
Figure 2:
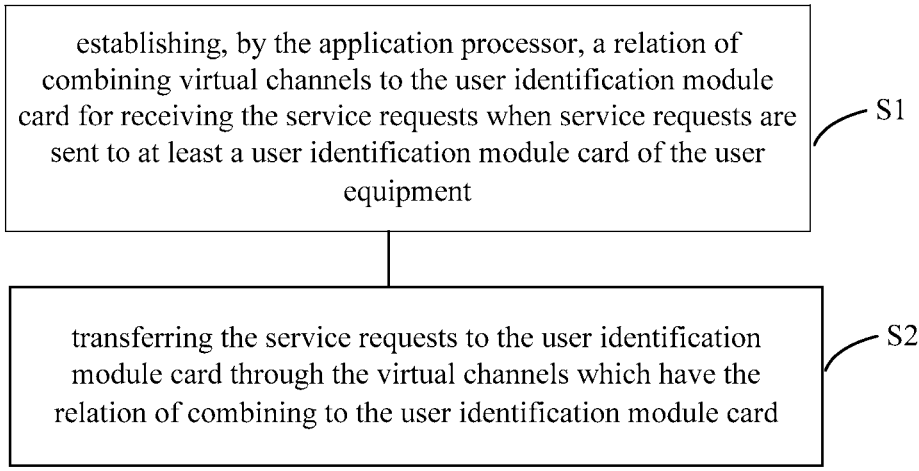
FIG. 2 is a schematic flow chart of a method for communicating the terminal equipment and the user equipment according to an embodiment of the invention.
Figure 3:
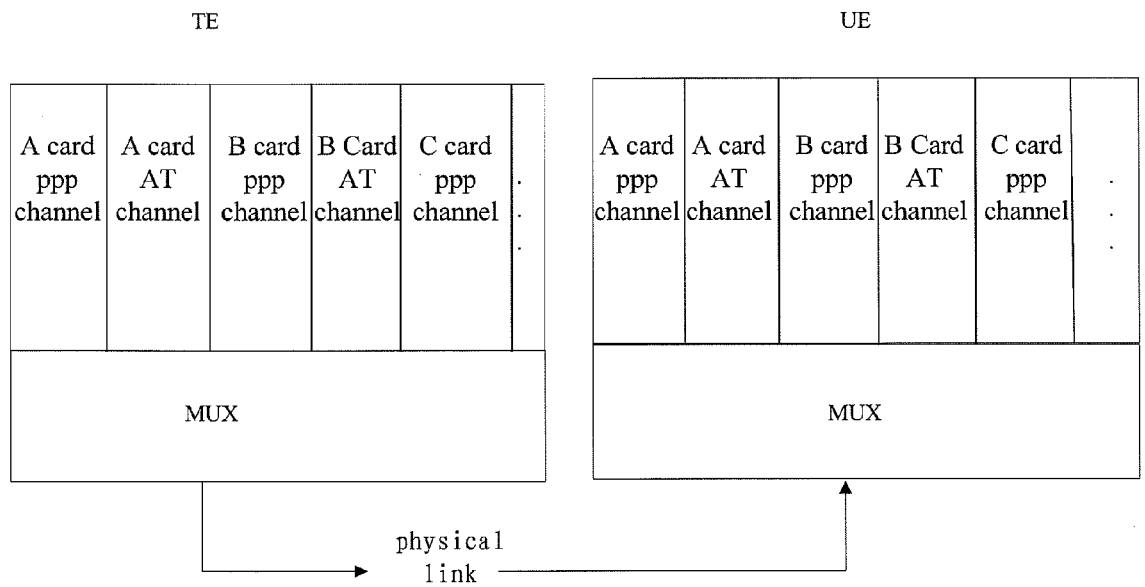
FIG. 3 schematically illustrates a MUX operation of the terminal equipment and the user equipment according to an embodiment of the invention.

FIG. 2 is a schematic flow chart of a method for communicating an application processor and a modem according to an embodiment of the invention. With reference to FIG. 2 in combination with FIG. 3, a physical link is established between a terminal equipment (TE) and a user equipment (UE). Based upon the MUX protocol between a terminal equipment and a user equipment, the physical link corresponds to multiple virtual channels each of which fulfills a function. FIG. 3 schematically shows a MUX operation of a terminal equipment and a user equipment. In one embodiment, the terminal equipment refers to an application processor and the user equipment refers to a modem. A physical link is provided between the application processor and the modem, and corresponds to multiple virtual channels. In one embodiment, the modem is embedded in the user equipment which is adapted to multiple SIM cards. A method for communicating the application processor and the modem, comprises:

Step S1: when a service request is sent to at least a user identification module card in the user equipment, the application processor establishes a relation of combining a virtual channel to a user identification module card for receiving the service request; Step S2, the service request is transferred through the virtual channel with the relation of biding to the user identification module card. The above steps will be described in detail taking the SIM card used in GSM network as an example, but the invention is not limited by this example and is also adapted to user identification module cards used for other communication network, for example UIM card used in CDMA network.

In one embodiment of the invention, the user equipment is adapted to triple SIM cards, which are denoted as A card, B card and C card, respectively. In an exemplary embodiment, a method for communicating the application processor and the modem is interpreted, wherein the user equipment comprises multiple SIM cards.

In an embodiment of the invention, the application processor is embedded in the user equipment. The user equipment is an intelligent phone, in which a physical link is provided between the application processor and the modem, and corresponds to multiple virtual channels according to the MUX protocol.

A method for communicating the application processor and the modem according to an embodiment of the invention is described hereinafter, as an example, in which a service request from a calling user is processed by an intelligent phone including an application processor and a modem. Step S1, when a service request is sent to at least a SIM card of the user equipment, the application processor establishes a relation of a virtual channel to a SIM card for receiving the service request. For example, two virtual channels out of the virtual channels between the application processor and the modem (one of which is a PPP data dialing channel, while the other is an AT command transmission channel) are specified to transfer service requests to a SIM card, e.g. A card. The two virtual channels are identified as dedicated channels to transfer service requests to the SIM card which is combined to the virtual channels. In a specific embodiment, channel assignment instructions are transferred through the virtual channels, and comprise information related to the SIM card which is combined to the virtual channels, and channel types. According to the channel assignment instructions, the virtual channels are identified as dedicated channels for service requests of the SIM card containing the information related to the SIM card. The information related to the SIM card comprises card number of the SIM card, or other identification information for identifying the SIM card, such as mobile phone number etc. Also taking A card as an example, the channel assignment instructions comprise card number of A card and channel types. In the case of service requests from a calling user, the channel types comprise PPP data dialing channel and AT command channel. The application processor transfers channel assignment instructions to A card of the user equipment through two virtual channels. Based upon the channel types and the card number, the two virtual channels transferring the channel assignment instructions are respectively identified, one of which as a PPP data dialing channel of A card, while the other as an AT command channel of A card. By this means, the deficiency in the art, that is, the channels for transferring service requests and the SIM card to which the service requests are transferred are both uncertain in the case of multi-card multi-standby, can be overcome.

FIG. 3 schematically illustrates a MUX operation of the terminal equipment and the user equipment according to an embodiment of the invention. In a specific embodiment, the terminal equipment (TE) refers to an application processor embedded in an intelligent phone, and the user equipment (UE) refers to a modem of an intelligent phone. Referring to FIG. 3, when triple SIM cards in an intelligent phone, including A card, B card and C card, simultaneously transfer service requests for calling services, channel assignment instructions are transferred through virtual channels between the application processor and the modem. The channel assignment instructions transferred by each virtual channel comprise card number of a SIM card which is combined to the virtual channel, and the channel types. More specifically, six virtual channels which transfer channel assignment instructions are respectively combined to A card, B card and C card for performing as data dialing PPP channels and AT command channels, and include an A card PPP channel and an A card AT command channel, a B card PPP channel and a B card AT command channel, and a C card PPP channel and a C card AT command channel. The service requests transferred by the A card PPP channel and the A card AT command channel are transferred to A card; the service requests transferred by the B card PPP channel and the B card AT command channel are transferred to B card; and the service requests transferred by the C card PPP channel and the C card AT command channel are transferred to C card. Thus, the deficiency in the prior art, that is, the channel for transferring service requests is uncertain in the case of multi-card multi-standby, could be overcome.

In a specific embodiment of the invention, the user equipment is an intelligent phone. In another embodiment of the invention, the user equipment is not restricted of an intelligent phone but could include other user equipments with a modem.

In an embodiment, the application processor is embedded in the intelligent phone. In other embodiments, the application processor may be installed in a terminal equipment, such as a personal computer or a vehicle mobile terminal, which controls the phone.

In another embodiment, a method for specifying virtual channels to transfer service requests of the SIM card which is combined with the virtual channels, comprises: adding information of the SIM card and channel types to the service requests. In this way, card number of a SIM card is annexed to the service request, obviating the problems that virtual channels for transferring service requests and a SIM card which receives the service requests are both uncertain.

Step S2, the service requests are transferred to the user identification module card through the virtual channels which are combined to the user identification module card. According to description of step S1, service requests for calling users, which are transferred to A card, are transferred through A card PPP channel and A card AT command channel; service requests for calling users, which are transferred to B card, are transferred through B card PPP channel and B card AT command channel; and service requests for calling users, which are transferred to C card, are transferred through C card PPP channel and C card AT command channel.

In other embodiments of the invention, multiple sorts of service requests are performed by the application processor. For example, A card is provided to call a user, and/or B card is provided to send short messages. According to the invention, the application processor is not limited to transfer service requests to one SIM card, but is able to transfer service requests to multiple SIM cards. The service requests are not limited for calling users, but also include: calling a user, sending short messages, managing phone book, transmitting data and so on.

In GSM protocol 3GPP 27.010, the terminal equipment TE controls a mobile station (MS) by sending AT instructions. AT (i.e. Attention) instruction sets are sent, from a terminal equipment (TE) or a data terminal equipment (DTE), to a terminal adapter (TA) or a data circuit terminal equipment. A method for communicating an application processor and a modem is interpreted in an exemplary embodiment of the invention. Users control calling, short messages, phone book, data service and facsimile and so on with AT instructions.

In a specific embodiment of the invention, when the application processor sends a service request to at least a SIM card of the user equipment, channel assignment instructions establish a relation of combining virtual channels to a SIM card for receiving the service request. Specifically, a new AT command (channel assignment instructions) is provided to configure MUX channels without revision of standard AT command format, for example dynamically collocating functions of MUX channels between an application processor and a modem, and combining the functions to a certain SIM card. In particular, when a MUX link is established, a new AT command is required to configure a virtual channel to be combined to a SIM card (e.g. A card) when each channel is used. Actions related to A card are performed between the application processor and the modem through the virtual channel, for example, the virtual channel acting as an A card AT command channel, or the virtual channels acting as A card a PPP channel.

Figure 4:
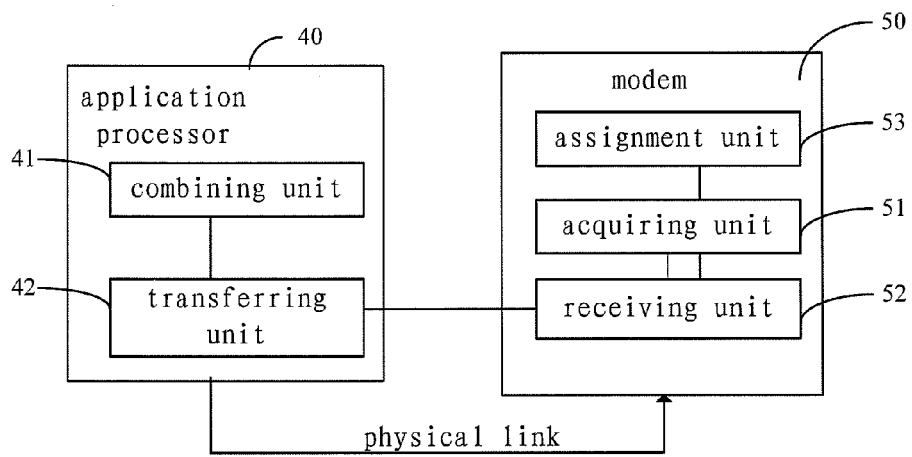
FIG. 4 is a schematic diagram showing a connection between an application processor and the user equipment according to an embodiment of the invention.

In accordance with the method for communicating the application processor and the modem, an application processor is provided. FIG. 4 is a schematic diagram showing a connection between an application processor and a modem according to an embodiment of the invention. Referring to FIG. 4, the application processor 40 sends a service request to a modem 50. The modem 50 is embedded in a user equipment. A physical link is provided between the application processor 40 and the modem 50, and corresponds to multiple virtual channels. The user equipment is adapted to multiple SIM cards. The application processor 40 comprises:

a combining unit 41 for establishing a relation of combining a virtual channel with a subscriber identification module (SIM) card of a service request when an application processor sends a service request to at least a SIM card of the user equipment; and a transferring unit 42 for sending the service request to the SIM card through the virtual channels which has the relation of combining with the SIM card.

In another embodiment, a modem is provided, correspondingly. Referring to FIG. 4, the modem 50 is adapted for receiving service requests from an application processor 40, and comprises:

an acquiring unit 51 for acquiring from the application processor a relation of combining virtual channels to a SIM card;

a receiving unit 52 for receiving the service requests from the application processor through the virtual channels; and an assignment unit 53 for assigning the service requests from the receiving unit to the SIM card which has the relation of combining with the virtual channels transferring the service request.

The combining unit 41 of the application processor 40 establishes a relation of combining the SIM card to the virtual channels in such a way that the virtual channels are specified as dedicated channels for transferring the service requests of the SIM card which is combined with the virtual channels. In one embodiment, the combining unit 41 specifies, by channel assignment instructions, the virtual channels as dedicated channels for transferring the service requests of the SIM card which is combined with the virtual channels. The channel assignment instructions comprise channel types and information related to the SIM card which is combined with the virtual channels. Further referring to FIG. 3, in an exemplary embodiment which includes an application processor embedded in a user equipment, i.e. intelligent phone, when triple SIM cards in a triple-card triple-standby intelligent phone, including A card, B card and C card, are used at one time for service requests for calling users, the combining unit 41 specifies, by channel assignment instructions, virtual channels as dedicated channels for transferring the service requests of the SIM card which is combined with the virtual channels. Specifically, the combining unit 41 transfers the channel assignment instructions to the transferring unit 42 through the virtual channels between the application processor and the modem. The channel assignment instructions, which are transferred in each virtual channel, comprise channel types and card number information related to SIM card which is combined with the virtual channels. In one embodiment, the channel assignment instructions are transferred through six channels. The transferring unit 42 of the application processor 40 sends the channel assignment instructions to the modem 50 of the user equipment through the virtual channels. After the channel assignment instructions are sent to the modem 50 of the user equipment, the six virtual channels are respectively combined to the A card, the B card and the C card, and correspondingly, are respectively denoted to be A card data dialing PPP channel and A card AT command channel, B card data dialing PPP channel and B card AT command channel, and C card data dialing PPP channel and C card AT command channel. Accordingly, service requests of calling users are sent to the A card through the A card data dialing PPP channel and the A card AT command channel. Service requests of calling users are sent to the B card through the B card data dialing PPP channel and the B card AT command channel. Service requests of calling users are sent to the C card through the C card data dialing PPP channel and the C card AT command channel.

When the application processor 40 sends channel assignment instructions to the modem 50, the acquiring unit 51 of the modem 50 acquires the relation of the virtual channels combining to the SIM card upon receiving and parsing the channel assignment instructions. Specifically, the acquiring unit 51 of the modem 50 parses the channel assignment instructions of the receiving unit 52 so as to acquire the relation of the virtual channels combining to the SIM card. After the receiving unit 52 receives the service requests of the application processor 40 through the virtual channels, according to the combining relation acquired by the acquiring unit 51, the assignment unit 53 assigns the service requests to the SIM card which has the relation of combining with the virtual channels. Still according to this embodiment in which service requests are transferred to the A card, the B card and the C card at one time, the receiving unit 52 receives the channels assignment instructions from the transferring unit

42. The acquiring unit 51 acquires the relations of the six virtual channels individually combining to the A card, the B card and C card according to the channel assignment instruction of the receiving unit 52. The service requests of calling users which are sent through the A card PPP channel and the A card AT command channel are sent to the A card; the service requests of calling users which are sent through the B card PPP channel and the B card AT command channel are sent to the B card; and the service requests of calling users which are sent through the C card PPP channel and the C card AT command channel are sent to the C card. The receiving unit 52 receives the service requests of calling users after receives the channel assignment instructions. The assignment unit 53 assigns the service requests received by the receiving unit 52 to the A card, the B card and the C card.

In other embodiment of the invention, the combining unit 41 of the application processor adds, to the service requests, channel types and information related to SIM card which is combined with the virtual channels, and thus specifies the virtual channels as dedicated channels for transferring the service requests of the SIM card which is combined with the virtual channels. The transferring unit 42 sends the service requests, which are annexed with the channel types and the information related to SIM card which is combined with the virtual channels, to the modem 50 through the virtual channels.

The receiving unit 52 of the modem 50 receives the service requests through the virtual channels. The acquiring unit 51 parses the service requests received by the receiving unit 52, and acquires the relation of combining the SIM card with the virtual channels for providing to the assignment unit 53. The assignment unit 53 assigns the service requests to the SIM card. In another embodiment of the invention, the application processor is embedded in a computer or a vehicle device.

In this invention, the application processor has a combining unit which establishes the relation of combining the SIM card with the virtual channels, avoiding that the virtual channels are jumbled with the SIM cards.

The modem has an assignment unit which assigns the received service requests to the corresponding SIM card, avoiding that the virtual channels are jumbled up in case of multi-card multi-standby, for example triple-card triple-standby or dual-card dual-standby.

The invention is described above in connection with preferred embodiments. However, the preferred embodiments shall not limit the scope of the invention. Those skilled in the art can make various alternations and modifications to the preferred embodiments without departing from the spirit and scope of the invention. Therefore, the scope of the invention shall be defined as in the appended claims.

The invention claimed is:

1. A method for communicating an application processor and a modem, comprising:
   providing a physical link between the application processor and the modem and corresponding to multiple virtual channels, the modem being embedded in a user equipment which is adapted for multiple user identification module cards;
   establishing, by the application processor, a relation of combining virtual channels to the user identification module card for receiving the service requests when service requests are sent to at least a user identification module card of the user equipment; and
   transferring the service requests to the user identification module card through the
   virtual channels which have the relation of combining to the user identification module card.

2. The method for communicating an application processor and a modem according to claim 1, wherein establishing a relation of combining virtual channels to the user identification module card comprises: specifying the virtual channels as dedicated
   channels for transferring the service requests of the user identification module card which is combined with the virtual channels.

3. The method for communicating an application processor and a modem according to claim 2, wherein specifying the virtual channels as dedicated channels for transferring the service requests of the user identification module card which is combined with the virtual channels, comprises: transferring channel assignment instructions to the modem through the virtual channels, the channel assignment instructions including channel types and information related to the user identification module card which is combined with the virtual channels.

4. The method for communicating an application processor and a modem according to claim 2, wherein specifying the virtual channels as dedicated channels for transferring the service requests of the user identification module card which is combined with the virtual channels, comprises: adding, channel types and information related to the user identification module card which is combined with the virtual channels, to the service requests.

5. The method for communicating an application processor and a modem according to claim 3, wherein the channel types comprise Point-to-Point Protocol channels and Attention (AT) channels.

6. The method for communicating an application processor and a modem according to claim 1, wherein the application processor is embedded in a terminal equipment or the user equipment.

7. The method for communicating an application processor and a modem according to claim 1, wherein the user equipment is adapted for multiple user identification module cards, comprises: the user equipment is adapted for triple user identification module cards.

8. An application processor, adapted to send service requests to a modem embedded in a user equipment, a physical link being provided between the application processor and the modem and corresponding to multiple virtual channels, the user equipment being adapted for multiple user identification module cards, the application processor comprising:
   a combining unit for establishing a relation of combining virtual channels to a user identification module card for receiving the service requests when the application processor sends service requests to at least a user identification module card of the user equipment; and
   a transferring unit for transferring the service requests associated with the user identification module card to the modem through the virtual channels which have the relation of combining to the user identification module card.

9. The application processor according to claim 8, wherein the combining unit specifies the virtual channels as dedicated channels for transferring the service requests of the user identification module card which is combined with the virtual channels, thereby establishing the relation of combining virtual channels to the user identification module card.

10. The application processor according to claim 9, wherein the combining unit specifies, by channel assignment instructions, the virtual channels as dedicated channels for transferring the service requests of the user identification module card which is combined with the virtual channels, the channel assignment instructions including channel types and information related to the user identification module card which is combined with the virtual channels, and wherein the transferring unit transfers the channel assignment instructions to the modem through the virtual channels.

11. The application processor according to claim 10, wherein the channel types comprise Point-to-Point Protocol channel and Attention (AT) channel.

12. The application processor according to claim 9, wherein the combining unit specifies the virtual channels as dedicated channels for transferring the service requests of the user identification module card which is combined with the virtual channels by adding, channel types and information related to the user identification module card which is combined with the virtual channels, to the service requests.

13. The application processor according to claim 12, wherein the channel types comprise Point-to-Point Protocol channel and Attention (AT) channel.

14. The application processor according to claim 8, wherein the application processor is embedded in a terminal equipment or the user equipment.

15. The application processor according to claim 14, wherein the terminal equipment is a computer or a vehicle device.

16. The application processor according to claim 8, wherein the user equipment is adapted for multiple user identification module cards, comprises: the user equipment is adapted for triple user identification module cards.

17. A modem embedded in a user equipment, being adapted for receiving service requests from an application processor, and comprising:
    an acquiring unit for acquiring a relation of combining virtual channels to a user identification module card from the application processor;
    a receiving unit for receiving the service requests from the application processor through the virtual channels; and
    an assignment unit for assigning the service requests from the receiving unit to the user identification module card which has the relation of combining with the virtual channels.

18. The modem according to claim 17, wherein the application processor has a combining unit for establishing, by channel assignment instructions, a relation of combining the user identification module card with virtual channels, the channel assignment instructions including channel types and information related to the user identification module card which is combined with the virtual channels;
    wherein the application processor has a transferring unit for transferring the channel assignment instructions to the modem through the virtual channels; and
    wherein the acquiring unit of the modem acquires the relation of combining the virtual channels with the user identification module card by receiving and parsing the channel assignment instructions.

19. The modem according to claim 17, wherein the application processor has a combining unit for establishing the relation of combining virtual channels to a user identification module card by adding, channel types and information related to the user identification module card which is combined with the virtual channels, to the service requests;
    and wherein the acquiring unit of the modem acquires the relation of combining the user identification module card with the virtual channels by parsing the service requests of the receiving unit.

20. The modem according to claim 18, wherein the channel types comprise Point-to-Point Protocol channel and Attention (AT) channel.

21. The modem according to claim 17, wherein the user equipment is a triple-card triple-standby intelligent phone.

* * * * *